(12) United States Patent
Hu et al.

(10) Patent No.: US 9,208,537 B1
(45) Date of Patent: Dec. 8, 2015

(54) SUPER-RESOLUTION RECONSTRUCTING METHOD FOR ENHANCING SMOOTHNESS AND SHARPNESS OF VIDEO IMAGE

(71) Applicant: Shenzhen China Star Optoelectronics Technology Co., Ltd., Shenzhen, Guangdong (CN)

(72) Inventors: Houliang Hu, Guangdong (CN); Hao Li, Guangdong (CN); Liwei Chu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/384,658

(22) PCT Filed: Aug. 15, 2014

(86) PCT No.: PCT/CN2014/084447
§ 371 (c)(1),
(2) Date: Sep. 11, 2014

(30) Foreign Application Priority Data

Jul. 10, 2014 (CN) .......................... 2014 1 0329177

(51) Int. Cl.
*G06K 9/32* (2006.01)
*G06T 3/40* (2006.01)
*G06T 5/00* (2006.01)
*G06T 7/00* (2006.01)

(52) U.S. Cl.
CPC ............... *G06T 3/4053* (2013.01); *G06T 5/002* (2013.01); *G06T 5/003* (2013.01); *G06T 7/0085* (2013.01); *G06T 2207/10004* (2013.01); *G06T 2207/10024* (2013.01)

(58) Field of Classification Search
CPC ......... G06T 3/40; G06T 3/4007; G06T 3/602; G06T 3/4023; G06T 3/4053; G06T 5/002; G06T 5/003; G06T 7/0085; H04N 1/40068
See application file for complete search history.

(56) References Cited

U.S. PATENT DOCUMENTS

| 7,941,004 | B2 * | 5/2011 | Zhu | G06T 3/4053 345/3.3 |
| 9,118,872 | B1 * | 8/2015 | Goodman | H04N 1/58 |
| 2008/0002909 | A1 * | 1/2008 | Tsin | G06T 3/403 382/275 |
| 2009/0316794 | A1 * | 12/2009 | Tanaka | G06T 3/403 375/240.24 |
| 2011/0158322 | A1 * | 6/2011 | Ozawa | H04N 1/00244 375/240.16 |
| 2013/0278727 | A1 * | 10/2013 | Tamir | H04N 13/0048 348/47 |
| 2014/0300726 | A1 * | 10/2014 | Gladnick | G01N 21/8851 348/86 |
| 2015/0093039 | A1 * | 4/2015 | Li | G06T 3/403 382/266 |

* cited by examiner

*Primary Examiner* — Amir Alavi
(74) *Attorney, Agent, or Firm* — Andrew C. Cheng

(57) ABSTRACT

A super-resolution reconstructing method includes: providing an original image including multiple original image pixel points arranged in an array; performing edge detecting on the original image by Canny_H method and considering pixel edge information of 4*4 area image range; performing 2*2 times interpolation zooming to edge pixel points and determining a type of the 4*4 area image as pure color entity area or non-pure color entity area according to the pixel edge information; performing a conditional interpolation individually on pure color entity area and non-pure color entity area; and obtaining a pixel 2*2 times interpolation zoomed super-resolution image. In pure color entity area, interpolation is performed according to edge information of 4*4 area image range to maintain border sharpness of pure color entity area and reduce jaggies. In non-pure color entity area, BiCubic_H interpolation is performed to enhance smoothness and sharpness of image.

16 Claims, 9 Drawing Sheets

| P00 | P01 | P02 |

| P10 | P11 | P12 |

| P20 | P21 | P22 |

Fig. 4

| P00 | P01 | P02 |

| P10 | P11 | P12 |

Fig. 5

SUPER-RESOLUTION RECONSTRUCTING METHOD FOR ENHANCING SMOOTHNESS AND SHARPNESS OF VIDEO IMAGE

This application is a 371 of PCT/CN2014/084447 Aug. 15, 2014.

TECHNICAL FIELD

The present invention relates to the field of liquid crystal display technology, and particularly to a super-resolution reconstructing method for enhancing smoothness and sharpness of video image.

DESCRIPTION OF RELATED ART

With the growing market demands of consumers, especially in high-end display fields, more high-end display devices are required. From the initial 480P cathode ray tube television (CRT TV) to the subsequent display devices with resolutions of 720P, FHD, 2K, 4K and 8K, etc., the display resolution and size of display device are gradually elevated.

For a 4K2K i.e., high-resolution panel, which simply means that a new-era display format with more than four times resolution of the traditional full high definition (FHD), and also termed as "quad full high definition (QFHD) TV". The 4K2K panel has a resolution of RGB 4096×2048 or 3840×2160, the resolution of FHD TV is 1920×1080, and thus the 4K2K is equivalent to four times the FHD specification. The 4K2K panel is manufactured by an oxide thin film chip, has a high electron moving speed, exhibits an image content with high resolution and thin border and shows ultra-thin texture, besides makes the TV to be more thin and light and the image to be more detailed, can be applied to naked eye 3D screen, satellite cloud image, aerial geographic information, etc. Accordingly, the 4K2K will become a mainstream specification of large-sized panels.

In order to reduce system operating cost and improve the quality of image, a super-resolution (SR) algorithm has become a mainstream algorithm in the current high-end display (e.g., 4K2K) field, which means to restore a low-resolution image or an image sequence into a high-resolution image.

The super-resolution algorithm is a technology for enhancing the resolution of image or video, which uses one or multiple (i.e., more than one) low resolution (LR) images to obtain one clear high resolution (HR) image by a corresponding algorithm. A process for obtaining one high resolution image from a series of low resolution images is referred to as super-resolution reconstruction. That is, a purpose of the super-resolution algorithm is to make a resolution of an output image or video to be higher than a resolution of any one frame of any one inputted image or video. The obtained high resolution image means that the image has a high pixel density, can provide more details, and the details are indispensable in many practical applications. However, many video sources do not reach such high resolution (e.g., FHD), in order to make the low resolution videos to be outstandingly played on a high resolution panel, the currently used super-resolution algorithm has the drawback of large amount of calculation, which results in the increase of cost and low practicality. In another aspect, simple and fast super-resolution algorithms such as near-replacing algorithm, bi-linear interpolation algorithm, Hermite interpolation algorithm and Canny interpolation algorithm would cause the problems of jagged and fuzzy images.

Referring to FIG. 1, which is a pixel matrix diagram of a conventional linear interpolation super-resolution algorithm. Pixel points of an original image are points of P00, P01, P10 and P11, and interpolated points are points of A, B and C, according to the concept of linear interpolation, it can be calculated simply that $A=\frac{1}{4}*P00+\frac{1}{4}*P01+\frac{1}{4}*P10+\frac{1}{4}*P11$, $B=\frac{1}{2}*P00+\frac{1}{2}*P01$, and $C=\frac{1}{2}*P00+\frac{1}{2}*P10$. Referring to FIG. 2, which is a pattern effect diagram after using the conventional linear interpolation algorithm of FIG. 1. As seen from FIG. 2, although the super-resolution algorithm of FIG. 1 is simple, the algorithm does not suppress or eliminate jaggies and has the problems of fonts being not clear and lack of smoothness.

SUMMARY

In order to solve the problem in the prior art, an objective of the present invention is to provide a super-resolution reconstructing method for enhancing smoothness and sharpness of video image, so as to effectively enhance the smoothness and sharpness of video image by using less resources.

In order to achieve the above objective, the present invention provides a super-resolution reconstructing method for enhancing smoothness and sharpness of video image including:

step 1: providing an original image, the original image including a plurality of original image pixel points P arranged in an array;

step 2: performing an edge detecting to the original image by use of Canny_H method and considering pixel edge information of a 4*4 area image;

step 3: performing a 2*2 times interpolation zooming on edge pixel points and determining a type of the area image as pure color entity area or non-pure color entity area according to the pixel edge information;

step 4: performing a conditional interpolation individually on pure color entity area and non-pure color entity area; and step 5: obtaining a pixel 2*2 times interpolation zoomed super-resolution image.

In an exemplary embodiment, the step 2 includes:

step 20: calculating direction and value of gradient of each of the original image pixel points by way of that using Sobel mask matrices $$\text{mask\_h} = \begin{bmatrix} -1 & -2 & -1 \\ 0 & 0 & 0 \\ 1 & 2 & 1 \end{bmatrix}, \text{mask\_v} = \begin{bmatrix} -1 & 0 & 1 \\ -2 & 0 & 2 \\ -1 & 0 & 1 \end{bmatrix},$$

$$\text{mask\_dr} = \begin{bmatrix} 2 & 1 & 0 \\ 1 & 0 & -1 \\ 0 & -1 & -2 \end{bmatrix} \text{ and mask\_dl} = \begin{bmatrix} 0 & -1 & -2 \\ 1 & 0 & -1 \\ 2 & 1 & 0 \end{bmatrix}$$

each to do a dot multiplication with a 3*3 matrix constituting by the original image pixel point and its neighboring 8 original image pixel points to thereby obtain 4 gradient values and taking a maximum value of the 4 gradient values as the value of gradient of the original image pixel point and saving its direction;

step 21: performing a non-maximal edge suppression to each of the original image pixel point according to the value of gradient and its direction of the original image pixel point; and step 22: performing an edge thinning to each of the original image pixel points and its neighboring 8 original image pixel points.

In an exemplary embodiment, when a point of edge detecting is the original image pixel point P11, when the step 20 determines the original image pixel point P11 as an edge of a horizontal direction and an edge value as G(P11), if satisfying G(P11)>½*G(P01) and G(P11)>½*G (21), records an edge value of the original image pixel point (P11) as G(P11); otherwise records the edge value of the original image pixel point (P11) as 0;

when the step 20 determines the original image pixel point P11 as an edge of a vertical direction and an edge value as G(P11); if satisfying G(P11)>½*G(P10) and G(P11)>½*G (12), records an edge value of the original image pixel point (P11) as G(P11); otherwise records the edge value of the original image pixel point (P11) as 0;

when the step 20 determines the original image pixel point P11 as an edge of a 45-degree direction and an edge value as G(P11); if satisfying G(P11)>½*G(P00) and G(P11)>½*G (22), records an edge value of the original image pixel point (P11) as G(P11), otherwise records the edge value of the original image pixel point (P11) as 0; and when the step 20 determines the original image pixel point P11 as an edge of a 135-degree direction and an edge value as G(P11); if satisfying G(P11)>½*G(P02) and G(P11)>½*G (20), records an edge value of the original image pixel point (P11) as G(P11); otherwise records the edge value of the original image pixel point (P11) as 0.

In an exemplary embodiment, in the step 3 of performing 2*2 times interpolation zooming on edge pixel points, an interpolation order is that: starting from the original image pixel point in a first row and first column, traversing the original image pixel points row by row and column by column, and interpolating 3 new pixel point when traverses each of the original image pixel points.

In an exemplary embodiment, when the type of the area image is pure color entity area, performing the interpolation according to a rule by using the edge information of the 4*4 area image.

In an exemplary embodiment, when the type of the area image is non-pure color entity area, performing a BiCubic_H interpolation in the non-pure color entity area.

In an exemplary embodiment, when traverses the original image pixel point P11, the original image pixel points P02, P12, P22 and P32 are edges and other 12 original image pixel points P00, P01, P03, P10, P11, P13, P20, P21, P23, P30, P31, P33 are not edge, then if:
|F(P10)−F(P11)|<0.125*max(F(P10),F(P11)),
|F(P20)−F(P21)|<0.125*max(F(P20),F(P21)),
|F(P12)−F(P13)|<0.125*max(F(P12),F(P13)) and
|F(P22)−F(P23)|<0.125*max(F(P22),F(P23)), the area image is determined as pure color entity area; otherwise it is determined as non-pure color entity area. The (F(P)) is the sum of RGB values of original image pixel point P, that is, F(P)=P(R)+P(G)+P(B); when the area image is determined as pure color entity area, corresponding interpolated points A, B and C satisfy that A=P11+P21, B=P11, and C=P11+P21.

In an exemplary embodiment, when traverses the original image pixel point P11, the original image pixel points P10, P11, P12 and P13 are edges and the other 12 original image pixel points P00, P01, P02, P03, P20, P21, P22, P23, P30, P31, P32, P33 are not edge, then if:
|F(P01)−F(P11)|<0.125*max(F(P01),F(P11)),
|F(P02)−F(P12)|<0.125*max(F(P02),F(P12)),
|F(P21)−F(P31)|<0.125*max(F(P21),F(P31)), and
|F(P22)−F(P32)|<0.125*max(F(P22),F(P32)), the area image is determined as pure color entity area; otherwise it is determined as non-pure color entity area. The (F(P)) is the sum of RGB values of original image pixel point P, that is, F(P)=P(R)+P(G)+P(B); when the area image is determined as pure color entity area, corresponding interpolated points A, B and C satisfy that A=P21+P22, B=P11+P12, and C=P21.

In an exemplary embodiment, when traverse the original image pixel point P11, the original image pixel points P22, P23, P30 and P31 are edges and the other 12 original image pixel points P00, P01, P02, P03, P10, P11, P12, P13, P20, P21, P32, P33 are not edge, then if:
|F(P02)−F(P12)|<0.125*max(F(P02),F(P12)),
|F(P03)−F(P13)|<0.125*max(F(P03),F(P13)),
|F(P22)−F(P32)|<0.125*max(F(P22),F(P32)), and
|F(P23)−F(P33)|<0.125*max(F(P23),F(P33)), the area image is determined as pure color entity area; otherwise it is determined as non-pure color entity area. The (F(P)) is the sum of RGB values of original image pixel point P, that is, F(P)=P(R)+P(G)+P(B); when the area image is determined as pure color entity area, corresponding interpolated points A, B and C satisfy that A=P21+P22, B=P11+P12, and C=P11+P21.

In an exemplary embodiment, when traverse the original image pixel point P11, the original image pixel points P02, P12, P20 and P21 are edges and the other 12 original image pixel points P00, P01, P03, P10, P11, P13, P22, P23, P30, P31, P32, P33 are not edge, then if:
|F(P01)−F(P11)|<0.125*max(F(P01),F(P11)),
|F(P02)−F(P12)|<0.125*max(F(P02),F(P12)),
|F(P21)−F(P31)|<0.125*max(F(P21),F(P31)), and
|F(P22)−F(P23)|<0.125*max(F(P22),F(P23)), the area image is determined as pure color entity area; otherwise it is determined as non-pure color entity area. The (F(P)) is the sum of RGB values of original image pixel point P, that is, F(P)=P(R)+P(G)+P(B); when the area image is determined as pure color entity area, corresponding interpolated points A, B and C satisfy that A=P21+P22, B=P11, and C=P21.

In an exemplary embodiment, when traverse the original image pixel point P11, the original image pixel points P10, P11, P22 and P32 are edges and the other 12 original image pixel points P00, P01, P02, P03, P12, P13, P20, P21, P23, P30, P31, P33 are not edge, then if:
|F(P10)−F(P11)|<0.125*max(F(P10),F(P11)),
|F(P20)−F(P21)|<0.125*max(F(P20),F(P21)),
|F(P12)−F(P13)|<0.125*max(F(P12),F(P13)), and
|F(P22)−F(P23)|<0.125*max(F(P22),F(P23)), the area image is determined as pure color entity area; otherwise it is determined as non-pure color entity area. The (F(P)) is the sum of RGB values of original image pixel point P, that is, F(P)=P(R)+P(G)+P(B); when the area image is determined as pure color entity area, corresponding interpolated points A, B and C satisfy that A=P11+P21, B=P11, and C=P11+P21.

Beneficial effects can be achieved by the present invention are that: the present invention provides a super-resolution reconstructing method for enhancing smoothness and sharpness of video image, which uses Canny_H method to perform an edge detecting on an original image and considers pixel edge information of a 4*4 area image, determines an type of the area image as pure color entity area or non-pure color entity area based on the pixel edge information obtained by the Canny_H method, and then performs a conditional interpolation individually on the two types. In the pure color entity area, uses the edge information of 4*4 to perform an interpolation based on a rule, so as to maintain the border sharpness of the pure color entity area and reduce the jaggies, and thereby to enhance the smoothness and sharpness. In the non-pure color entity area, it is performed with a BiCubic_H interpolation, so as to enhance the smoothness and sharpness.

In order to further understand the features and technical contents of the present invention, please refer to the following detailed description and accompanying drawings of the present invention. However, the drawings are provided for the purpose of illustration and description only, and are not intended to limit the present invention.

BRIEF DESCRIPTION OF THE DRAWINGS

Embodiments of the present invention will be described below in detail with reference to the drawings, and thereby the technical solutions of the present invention and other beneficial effects will be more apparent. In the drawings:

FIG. 4 is a selected 3*3 pixel matrix diagram according to the present invention;

FIG. 5 is a 2*3 pixel matrix diagram when the original pixel point P11 of FIG. 4 is an edge;

DETAILED DESCRIPTION OF EMBODIMENTS

In order to further illustrate the technical means adopted by the present invention and effects thereof, preferred embodiments of the present invention will be described below in detail with reference to the accompanying drawings.

Figure 3:
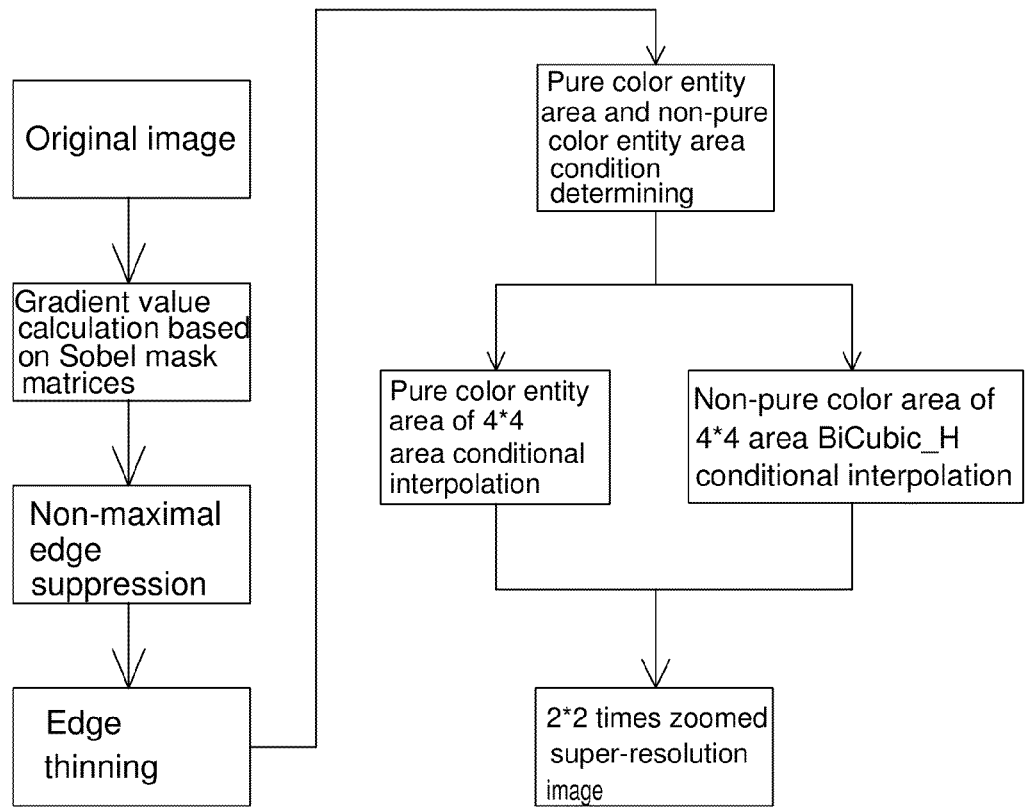
FIG. 3 is flowchart of a super-resolution reconstructing method for enhancing smoothness and sharpness of video image according to the present invention.

Referring to FIG. 3, which is a flowchart of a super-resolution reconstructing method for enhancing smoothness and sharpness of video image. The super-resolution reconstructing method includes:

step 1: providing an original image which includes a plurality of original image pixel points P arranged in an array;

step 2: performing an edge detecting to the original image by using a Canny_H method and considering pixel edge information of a 4*4 area image; herein, the Canny_H manner being obtained by simplifying and improving a traditional Canny operator;

step 20: calculating direction and value of gradient, and in particular, using Sobel mask matrices:

$$\text{mask\_h} = \begin{bmatrix} -1 & -2 & -1 \\ 0 & 0 & 0 \\ 1 & 2 & 1 \end{bmatrix}, \text{mask\_v} = \begin{bmatrix} -1 & 0 & 1 \\ -2 & 0 & 2 \\ -1 & 0 & 1 \end{bmatrix},$$

$$\text{mask\_dr} = \begin{bmatrix} 2 & 1 & 0 \\ 1 & 0 & -1 \\ 0 & -1 & -2 \end{bmatrix} \text{ and mask\_dl} = \begin{bmatrix} 0 & -1 & -2 \\ 1 & 0 & -1 \\ 2 & 1 & 0 \end{bmatrix},$$

each to perform a dot multiplication with a 3*3 matrix constituted by each original image pixel point and its neighboring 8 original image pixel points to thereby obtain 4 gradient values, taking a maximum value of the 4 gradient values as the gradient value of the original image pixel point and saving its direction;

step 21: performing a non-maximal edge suppression to each original image pixel point according to the gradient value and its direction of the original image pixel point;

In a horizontal direction: referring to FIG. 4, which is a selected 3*3 pixel matrix diagram of the present invention. The 3*3 pixel matrix includes original image pixel points P00, P01, P02, P10, P11, P12, P20, P21 and P22. When point of edge detecting is the original image pixel point P11, the step 20 determines the original image pixel point P11 as an edge of the horizontal direction and an edge value as G(P11); if satisfying that G(P11)>½*G(P01) and G(P11)>½*G(P21), records an edge value of the original image pixel point P11 as G(P11); otherwise records the edge value of the original image pixel point P11 as 0.

In a vertical direction: referring to FIG. 4, when point of edge detecting is the original image pixel point P11, the step 20 determines the original image pixel point P11 as an edge of the vertical direction and an edge value as G(P11); if satisfying that G(P11)>½*G(P10) and G(P11)>½*G(P12), records an edge value of the original image pixel point P11 as G(P11); otherwise records the edge value of the original image pixel point P11 as 0.

In a 45-degree direction: referring to FIG. 4, when point of edge detecting is the original image pixel point P11, the sub-step 20 determines the original image pixel point P11 as an edge of the 45-degree direction and an edge value as G(P11); if satisfying that G(P11)>½*G(P00) and G(P11)>½*G(P22), records an edge value of the original image pixel point P11 as G(P11); otherwise records the edge value of the original image pixel point P11 as 0.

Figure 6:
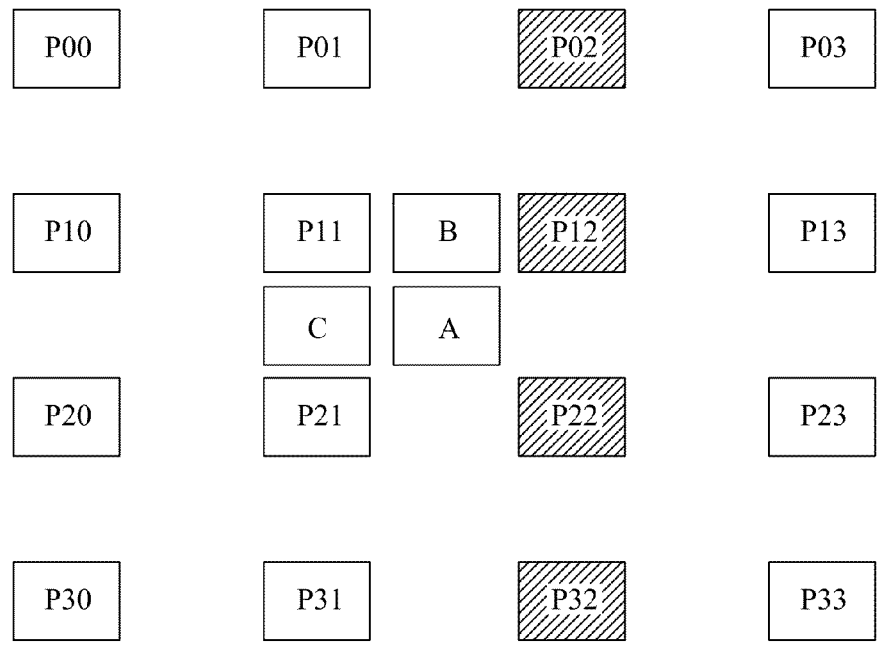
FIG. 6 is a pixel matrix diagram corresponding to a first condition of determining pure color entity area and non-pure color entity area according to the present invention.

In a 135-degree direction: referring to FIG. 4, when point of edge detecting is the original image pixel point P11, the sub-step 20 determines the original image pixel point P11 as an edge of the 135-degree direction and an edge value as G(P11); if satisfying that G(P11)>½*G(P02) and G(P11)>½*G(P20), records an edge value of the original image pixel point P11 is recorded as G(P11); otherwise records the edge value of the original image pixel point P11 as 0.

step 22: performing an edge thinning operation on each original image pixel point and its neighboring 8 original image pixel points. By the above steps, obtained edges have the existence of phenomenon of two-pixel-width edge in some place. In order to facilitate subsequent conditional interpolation, each original image pixel point and its neighboring original image pixel points are performed with the edge thinning operation. Referring to FIG. 5, which is a 2*3 pixel matrix diagram when the original image pixel point P11 in FIG. 4 is an edge. If the original image pixel points P00, P01 are edges, the edge value of the original image pixel point P01 is set to be 0; if the original image pixel points P01, P02 are edges, the edge value of the original image pixel point P01 is set to be 0; if the original image pixel points P00, P10 are edges, the edge value of the original image pixel point P10 is set to be 0.

step 3: performing a 2*2 times interpolation zooming operation to edge pixel points and determining a type of the 4*4 area image as pure color entity area or non-pure color entity area according to the pixel edge information;

Referring to FIG. 6, which is a pixel matrix diagram corresponding to a first condition of determining pure color entity area and non-pure entity area of the present invention. The pixel matrix diagram also is a zooming matrix diagram of pixel 2*2 times interpolation. The selected pixel points are a 4*4 matrix and include original image pixel points P00, P01, P02, P03, P10, P11, P12, P13, P20, P21, P22 and P23. The edge pixel points are performed with 2*2 times interpolation zooming, and an interpolation order is that: starting from the original image pixel point in a first row and first column, traversing the original image pixel points row by row and column by column, and interpolating 3 new pixel points when traverses each of the original image pixel points. In particular, as illustrated in FIG. 6, when traverses the original image pixel point P11, the 3 interpolated new pixel points are points A, B and C, and similarly when traverses the other original image pixel points, and finally a pixel 2*2 times super-resolution zooming diagram is obtained.

By combining edge obtaining manners, based on determining of some specific images and considering the edge information of the 4*4 original image pixel points, there are 85 kinds of conditions of determining pure color entity area and non-pure color entity area in total. Herein, 5 kinds of conditions are listed below:

(1) as to a first kind of condition of determining pure color entity area and non-pure color entity area: referring to FIG. 6, when traverses the original image pixel point P11, the original image pixel points P02, P12, P22, P32 are edges, and the other 12 original image pixel point are not edge, and then if:
|F(P10)−F(P11)|<0.125*max(F(P10),F(P11)),
|F(P20)−F(P21)|<0.125*max(F(P20),F(P21)),
|F(P12)−F(P13)|<0.125*max(F(P12),F(P13)), and
|F(P22)−F(P23)|<0.125*max(F(P22),F(P23)), it is determined as pure color entity area; otherwise it is determined as non-pure color entity area. Herein, F(P) is the sum of RGB values of original image pixel point P, i.e., F(P)=P(R)+P(G)+P(B), the followings are the same.

Figure 7:
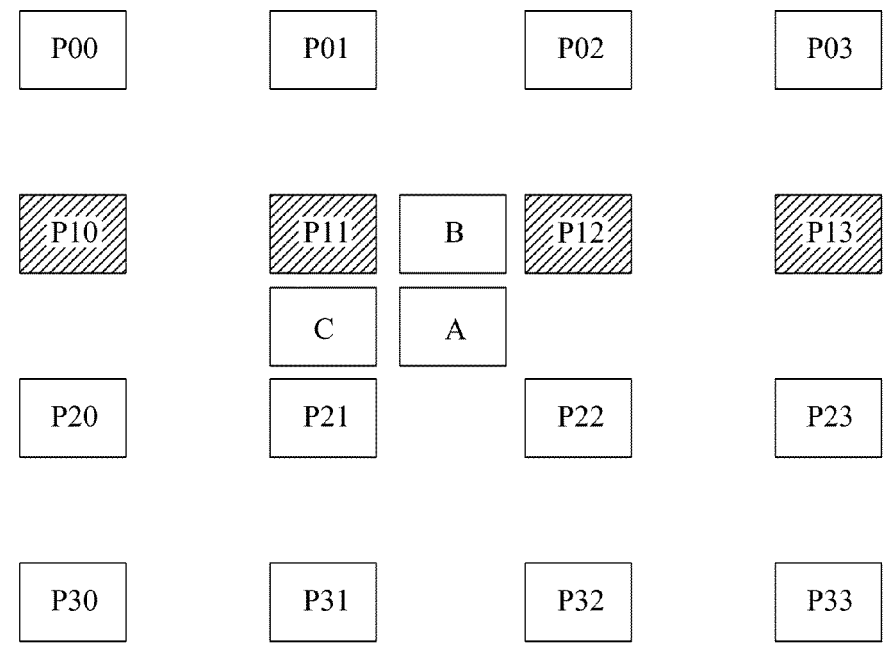
FIG. 7 is a pixel matrix diagram corresponding to a second condition of determining pure color entity area and non-pure color entity area according to the present invention.

(2) as to a second kind of condition of determining pure color entity area and non-pure color entity area: referring to FIG. 7, which is a pixel matrix diagram corresponding to the second condition of determining pure color entity area and non-pure color entity area. When traverses the original image pixel point P11, the original image pixel points P10, P11, P12 and P13 are edges, the other 12 original image pixel points are not edge, and then if:
|F(P01)−F(P11)|<0.125*max(F(P01),F(P11)),
|F(P02)−F(P12) 1<0.125*max(F(P02),F(P12)),
|F(P21)−F(P31)|<0.125*max(F(P21),F(P31)), and
|F(P22)−F(P32)|<0.125*max(F(P22),F(P32)), it is determined as pure color entity area; otherwise it is determined as non-pure color entity area.

Figure 8:
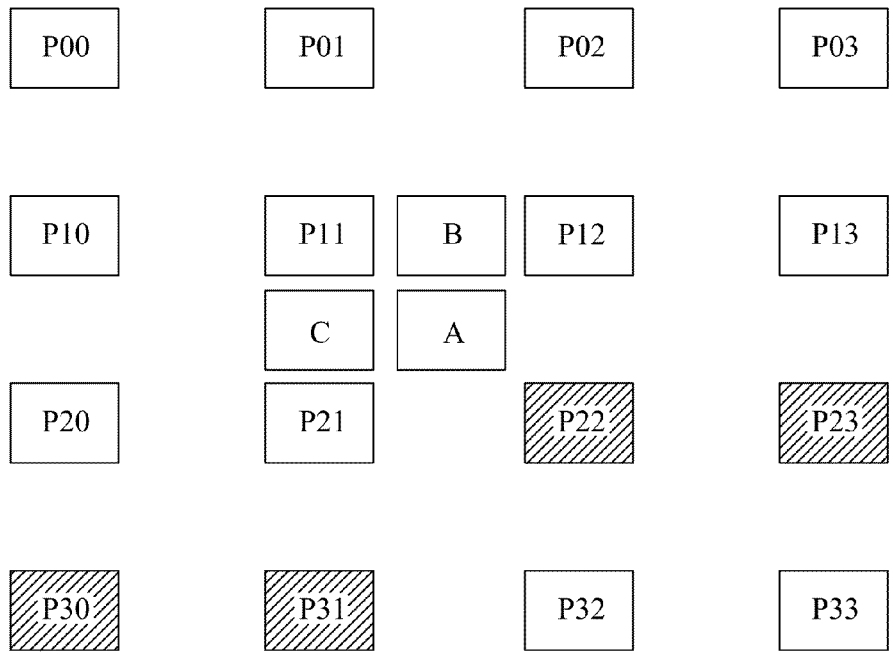
FIG. 8 is a pixel matrix diagram corresponding to a third condition of determining pure color entity area and non-pure color entity area according to the present invention.

(3) as to a third kind of condition of determining pure color entity area and non-pure color entity area: referring to FIG. 8, which is a pixel matrix diagram corresponding to the third condition of determining pure color entity area and non-pure color entity area of the present invention. When traverses the original image pixel point P11, the original image pixel points P22, P23, P30 and P31 are edges, and the other 12 original image pixel points are not edges, and then if:
|F(P02)−F(P12)|<0.125*max(F(P02),F(P12)),
|F(P03)−F(P13)|<0.125*max(F(P03),F(P13)),
|F(P22)−F(P32)|<0.125*max(F(P22),F(P32)), and
|F(P23)−F(P33)|<0.125*max(F(P23),F(P33)), it is determined as pure color entity area; otherwise it is determined as non-pure color entity area.

Figure 9:
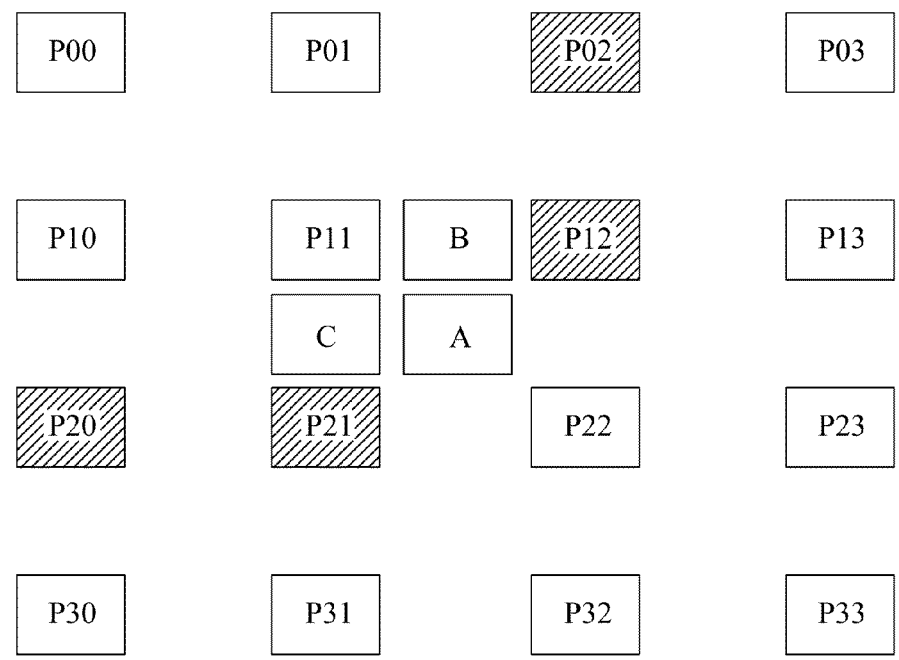
FIG. 9 is a pixel matrix diagram corresponding to a fourth condition of determining pure color entity area and non-pure color entity area according to the present invention.

(4) as to a fourth kind of condition of determining pure color entity area and non-pure color entity area: referring to FIG. 9, which is a pixel matrix diagram corresponding to the fourth condition of determining pure color entity area and non-pure color entity area of the present invention. When traverses the original image pixel point P11, the original image pixel points P02, P12, P20 and P21 are edges, and the other 12 original image pixel points are not edge, and then if:
|F(P01)−F(P11)|<0.125*max(F(P01),F(P11)),
|F(P02)−F(P12) 1<0.125*max(F(P02),F(P12)),
|F(P21)−F(P31)|<0.125*max(F(P21),F(P31)), and
|F(P22)−F(P23)|<0.125*max(F(P22),F(P23)), it is determined as pure color entity area; otherwise it is determined as non-pure color entity area.

Figure 10:
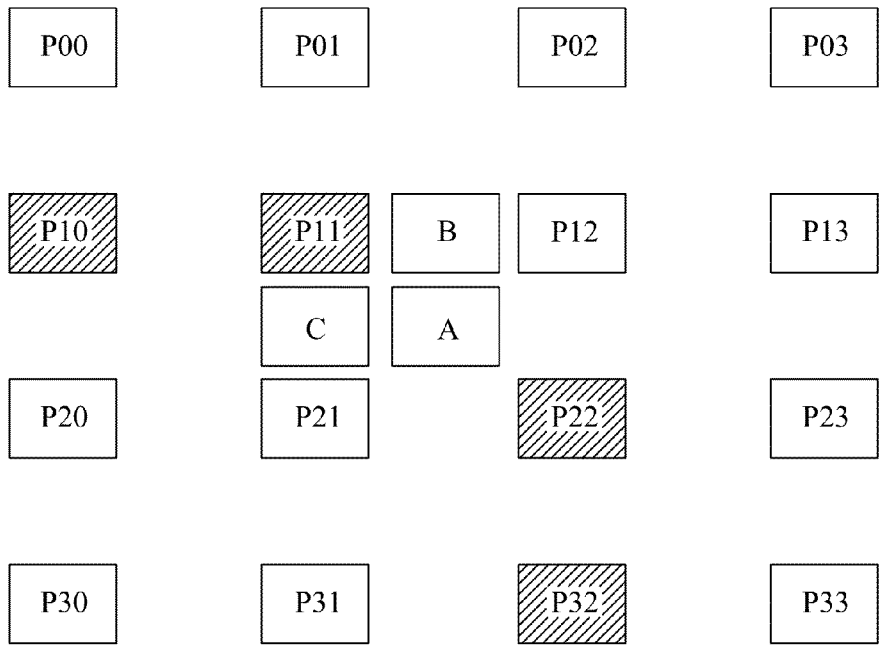
FIG. 10 is a pixel matrix diagram corresponding to a fifth condition of determining pure color entity area and non-pure color entity area according to the present invention.

(5) as to a fifth kind of condition of determining pure color entity area and non-pure color entity area: referring to FIG. 10, which is a pixel matrix diagram corresponding to the fifth condition of determining pure color entity area and non-pure color entity area of the present invention. When traverses the original image pixel point P11, the original image pixel points P10, P11, P22 and P32 are edges, and the other 12 original image pixel points are not edge, and then if:
|F(P10)−F(P11)|<0.125*max(F(P10),F(P11)),
|F(P20)−F(P21)|<0.125*max(F(P20),F(P21)),
|F(P12)−F(P13)|<0.125*max(F(P12),F(P13)) and
|F(P22)−F(P23)|<0.125*max(F(P22),F(P23)), it is determined as pure color entity area; otherwise it is determined as non-pure color entity area.

step 4: performing a conditional interpolation individually on pure color entity area and non-pure color entity area:

(1) pure color entity area interpolation: corresponding to 85 kinds of pure color entity area determining conditions mentioned in the above step 3, there are respective interpolation methods. For example, as to the 5 kinds of pure color entity area determining condition listed in the above step 3, if the determining results of the 5 kinds of determining conditions all are pure color entity area, calculations of interpolated points A, B, C for the 5 kinds of determining conditions respectively are that:

as to the first kind of condition as shown in FIG. 6: A=P11+P21, B=P11, C=P11+P21;

as to the second kind of condition as shown in FIG. 7: A=P21+P22, B=P11+P12, C=P21 as to the third kind of condition as shown in FIG. 8: A=P21+P22, B=P11+P12, C=P11+P21;

as to the fourth kind of condition as shown in FIG. 9: A=P21+P22, B=P11, C=P21;

as to the fifth kind of condition as shown in FIG. 10: A=P11+P21, B=P11, C=P11+P21.

Figure 11:
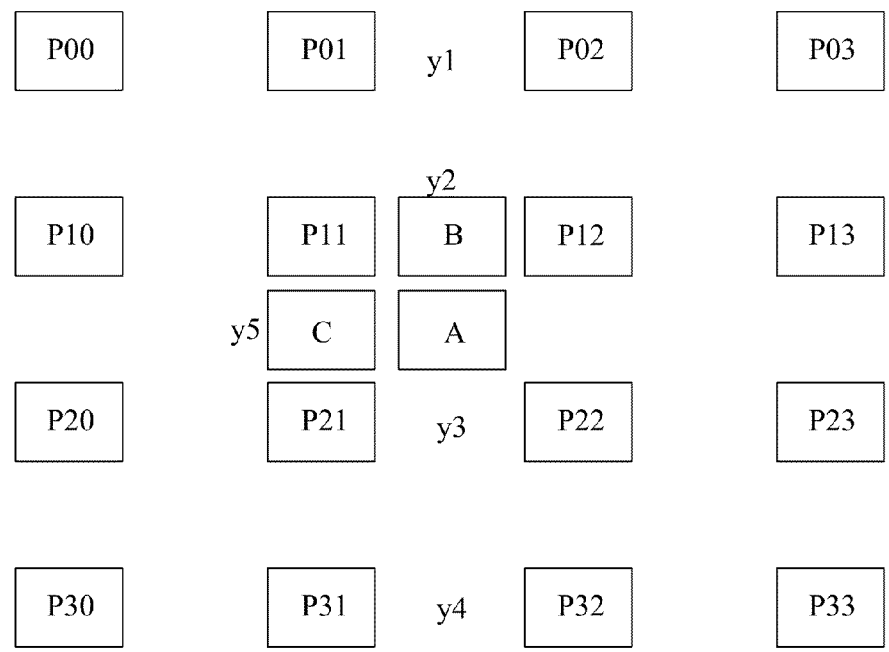
FIG. 11 is a pixel matrix diagram of performing a BiCubic_H interpolation according to the present invention.

(2) non-pure color entity area interpolation: referring to FIG. 11, which is a pixel matrix diagram of performing a BiCubic_H interpolation according to the present invention. It is assumed that original image pixel points P00, P01, P02, P03 are in a cubic function of $P(x)=ax^3+bx^2+cx+d$, and their x coordinate values respectively are −1, 0, 1 and 2, then expressions of a, b, c, d related to P00, P01, P02, P03 can be simply calculated according to P(−1), P(0), P(1), P(2) and first derivatives P'(0), P'(1). x coordinate value corresponding to y1 is 0.5, and then it can be calculated that y1=−1/16*P00+9/16*P01+9/16*P02−1/16*P03, if α=−1/16, β=−9/16, likewise, y2, y3, y4, y5 can be calculated as follows:

$$y2=\alpha*P10+\beta*P11+\beta*P12+\alpha*P13,$$

$$y3=\alpha*P20+\beta*P21+\beta*P22+\alpha*P23,$$

$$y4=\alpha*P30+\beta*P31+\beta*P32+\alpha*P33, \text{ and}$$

$$y5=\alpha*P01+\beta*P11+\beta*P21+\alpha*P31.$$

The y1, y2, y3, y4 then are performed with a bicubic interpolation such as BiCubic_H interpolation (i.e., simplifying and improving from a traditional BiCubic interpolation), and A is calculated that: A=α*y1+β*y2+β*y3+α*y4, and in addition, B=y2, C=y5. In order to enhance the contrast, the coefficients can be changed. Coefficients currently applied in the A, B, C expressions with good performance are that: α=−2/16, β=−10/16.

step 5: obtaining a pixel 2*2 times interpolation zoomed super-resolution image.

Figure 1:
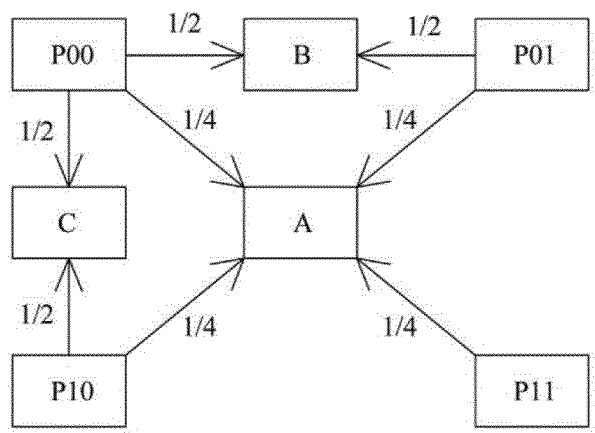
FIG. 1 is a pixel matrix diagram of a conventional linear interpolation super-resolution algorithm.
Figure 2:
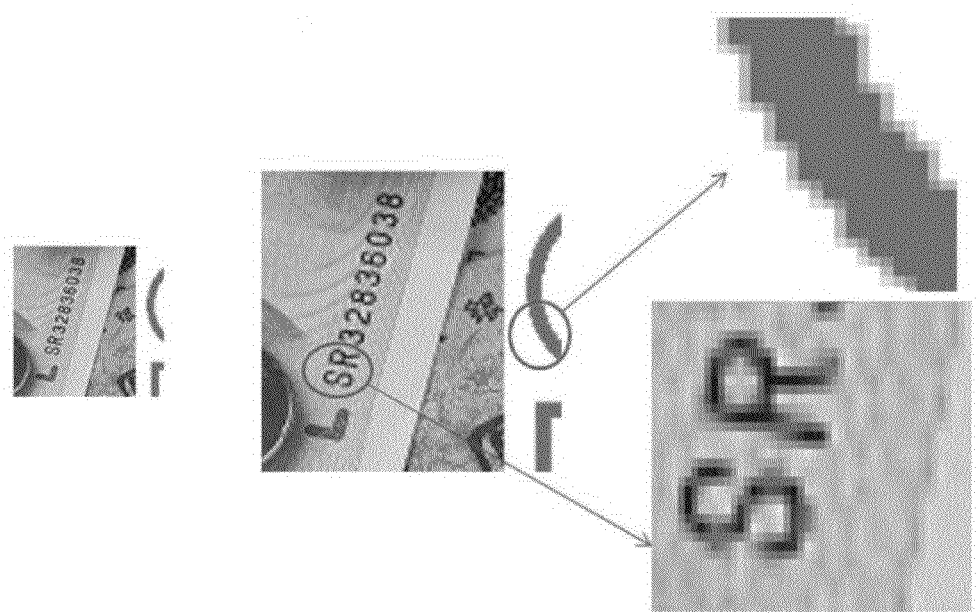
FIG. 2 is a pattern effect diagram after adopting the conventional linear interpolation method of FIG. 1.
Figure 12A:
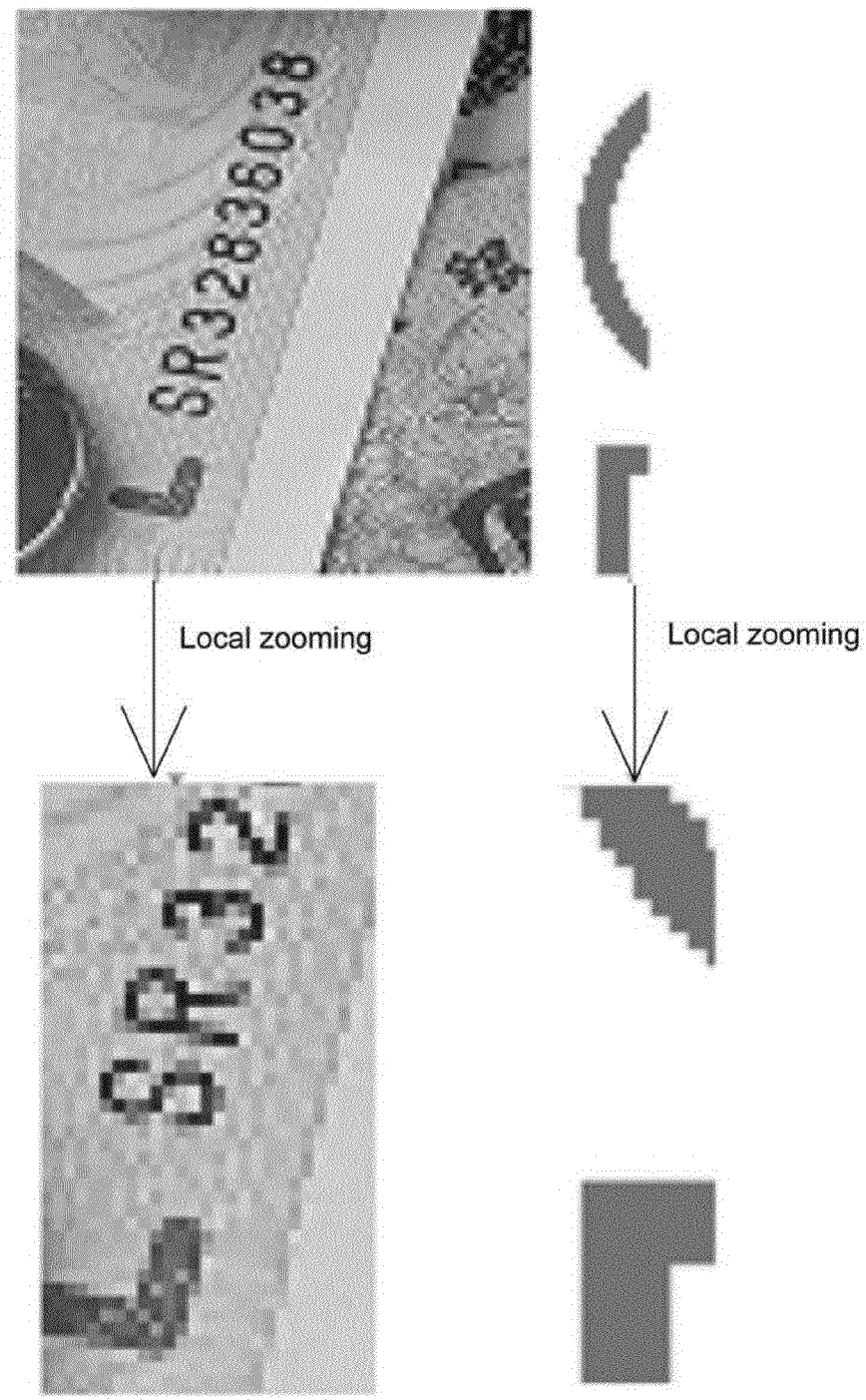
FIG. 12a is a simulation result of a pattern processed by a duplicating magnification method.
Figure 12B:
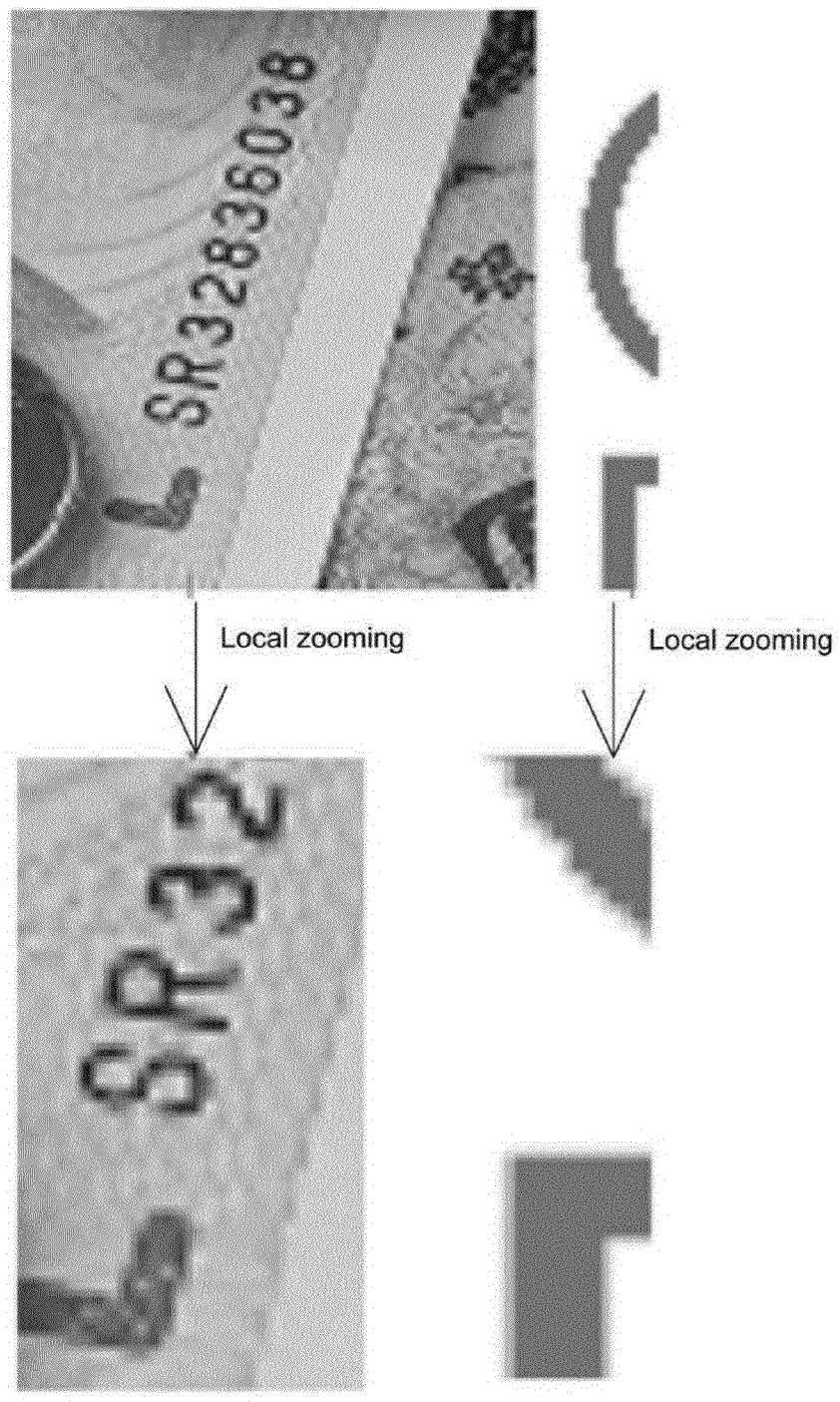
FIG. 12b is a simulation result of a pattern processed by the conventional linear interpolation method of FIG. 1.
Figure 12C:
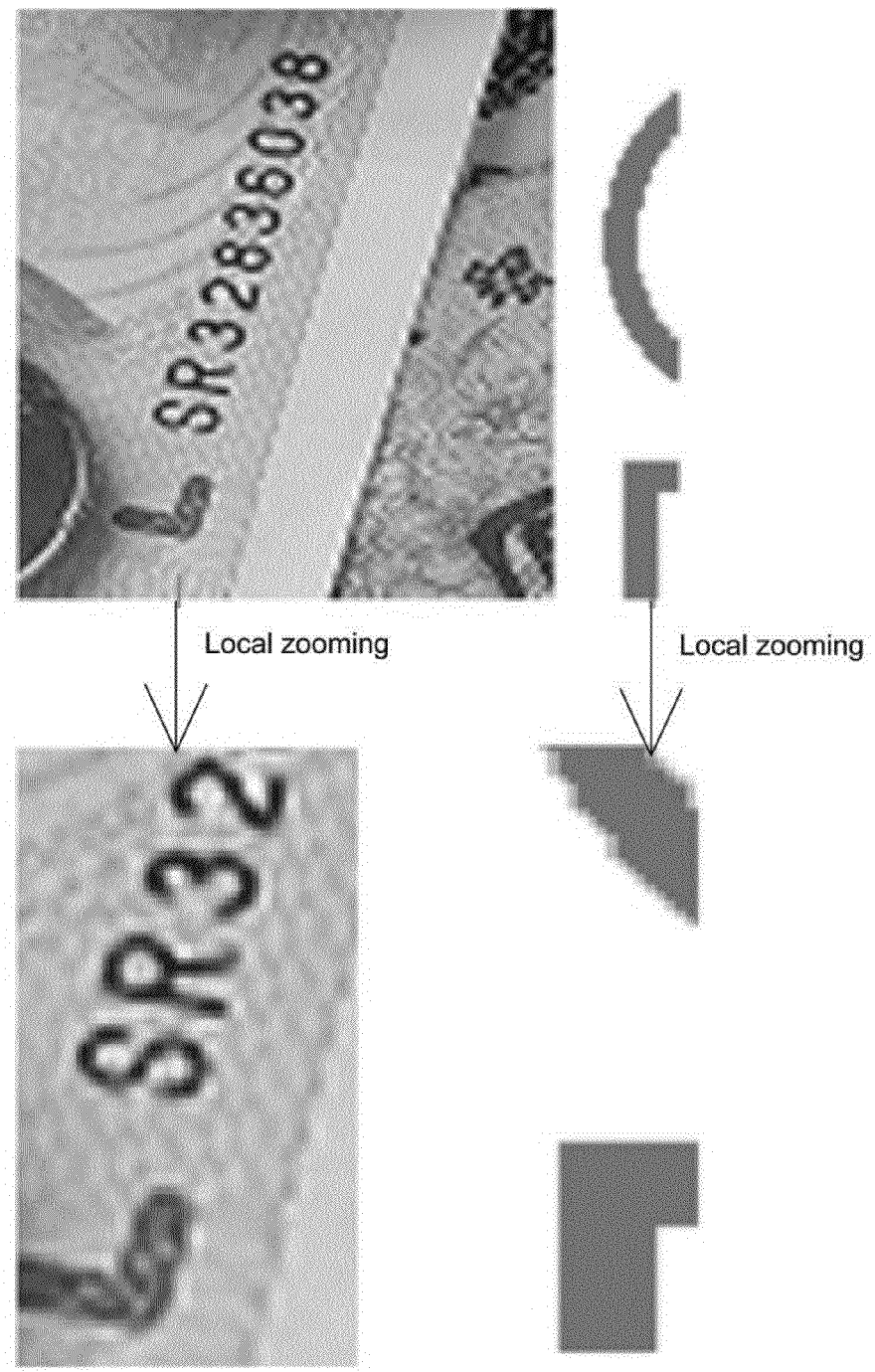
FIG. 12c is a simulation result of a pattern processed by the super-resolution algorithm of the present invention.

Referring to FIGS. 12a, 12b and 12c, FIG. 12a is a simulation result of a pattern processed by a duplicating magnification method. The method of copying enlarging is that: each pixel is duplicated to be 4 pixels, and then a 2*2 times super-resolution result is obtained. FIG. 12b is a simulation result of a pattern processed by the conventional linear interpolation method of FIG. 1, and FIG. 12c is a simulation result of a pattern processed by the super-resolution algorithm of the present invention. As seen from FIGS. 12a, 12b and 12c, the borders of the patterns although are not straight lines, after being processed by the super-resolution algorithm of the present invention, a better visual effect can be obtained with respect to the duplicating magnification method of FIG. 12a and the linear interpolation method of FIG. 12b, the jagged phenomenon is effectively reduced, and the smoothness and sharpness of video image are enhanced.

In summary, the super-resolution reconstructing method for enhancing smoothness and sharpness of video image according to the present invention uses Canny_H method to perform an edge detecting on an original image and considers pixel edge information of a 4*4 area image range, determines an type of the area image as pure color entity area or non-pure color entity area based on the pixel edge information obtained by the Canny_H method, and then performs a conditional interpolation individually on the two types. In the pure color entity area, uses the edge information of 4*4 area image range to perform an interpolation based on a rule, so as to maintain the border sharpness of the pure color entity area and reduce the jaggies, and thereby to enhance the smoothness and sharpness. In the non-pure color entity area, it is performed with a BiCubic_H interpolation, so as to enhance the smoothness and sharpness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A super-resolution reconstructing method for enhancing smoothness and sharpness of video image, comprising:
    step 1: providing an original image, wherein the original image comprises a plurality of original image pixel points (P) arranged in an array;
    step 2: performing an edge detecting to the original image by use of Canny_H method and considering pixel edge information of a 4*4 area image;
    step 3: performing a 2*2 times interpolation zooming on edge pixel points and determining a type of the area image as pure color entity area or non-pure color entity area according to the pixel edge information;
    step 4: performing a conditional interpolation individually on pure color entity area and non-pure color entity area; and
    step 5: obtaining a pixel 2*2 times interpolation zoomed super-resolution image.

2. The super-resolution reconstructing method as claimed in claim 1, wherein the step 2 comprises:
    step 20: calculating direction and value of gradient of each of the original image pixel points by way of that using Sobel mask matrices $$mask\_h = \begin{bmatrix} -1 & -2 & -1 \\ 0 & 0 & 0 \\ 1 & 2 & 1 \end{bmatrix}, mask\_v = \begin{bmatrix} -1 & 0 & 1 \\ -2 & 0 & 2 \\ -1 & 0 & 1 \end{bmatrix},$$

$$mask\_dr = \begin{bmatrix} 2 & 1 & 0 \\ 1 & 0 & -1 \\ 0 & -1 & -2 \end{bmatrix} \text{ and } mask\_dl = \begin{bmatrix} 0 & -1 & -2 \\ 1 & 0 & -1 \\ 2 & 1 & 0 \end{bmatrix}$$

each to do a dot multiplication with a 3*3 matrix constituting by the original image pixel point and its neighboring 8 original image pixel points to thereby obtain 4 gradient values and taking a maximum value of the 4 gradient values as the value of gradient of the original image pixel point and saving its direction;
    step 21: performing a non-maximal edge suppression to each of the original image pixel point according to the value of gradient and its direction of the original image pixel point; and
    step 22: performing an edge thinning to each of the original image pixel points and its neighboring 8 original image pixel points.

3. The super-resolution reconstructing method as claimed in claim 2, wherein when a point of edge detecting is the original image pixel point (P11),
    when the step 20 determines the original image pixel point (P11) as an edge of a horizontal direction and an edge value as (G(P11)), if satisfying G(P11)>½*G(P01) and G(P11)>½*G(21), records an edge value of the original image pixel point (P11) as G(P11); otherwise records the edge value of the original image pixel point (P11) as 0;
    when the step 20 determines the original image pixel point (P11) as an edge of a vertical direction and an edge value as (G(P11)); if satisfying G(P11)>½*G(P10) and G(P11)>½*G(12), records an edge value of the original image pixel point (P11) as G(P11); otherwise records the edge value of the original image pixel point (P11) as 0;
    when the step 20 determines the original image pixel point (P11) as an edge of a 45-degree direction and an edge value as (G(P11)); if satisfying G(P11)>½*G(P00) and G(P11)>½*G(22), records an edge value of the original image pixel point (P11) as G(P11), otherwise records the edge value of the original image pixel point (P11) as 0; and
    when the step 20 determines the original image pixel point (P11) as an edge of a 135-degree direction and an edge value as (G(P11)); if satisfying G(P11)>½*G(P02) and G(P11)>½*G(20), records an edge value of the original image pixel point (P11) as G(P11); otherwise records the edge value of the original image pixel point (P11) as 0.

4. The super-resolution reconstructing method as claimed in claim 1, wherein in the step 3 of performing 2*2 times interpolation zooming on edge pixel points, and an interpolation order is that: starting from the original image pixel point in a first row and first column, traversing the original image pixel points row by row and column by column, and interpolating 3 new pixel point when traverses each of the original image pixel points.

5. The super-resolution reconstructing method as claimed in claim 1, wherein when the type of the area image is pure color entity area, performing the interpolation according to a rule by using the edge information of the 4*4 area image.

6. The super-resolution reconstructing method as claimed in claim 1, wherein when the type of the area image is non-pure color entity area, performing a BiCubic_H interpolation in the non-pure color entity area.

7. The super-resolution reconstructing method as claimed in claim 1, wherein when traverses the original image pixel point (P11), the original image pixel points (P02), (P12), (P22) and (P32) are edges and other 12 original image pixel points (P00), (P01), (P03), (P10), (P11), (P13), (P20), (P21), P(23), (P30), P(31), (P33) are not edge, then if:
|F(P10)−F(P11)|<0.125*max(F(P10),F(P11)),
|F(P20)−F(P21)|<0.125*max(F(P20),F(P21)),
|F(P12)−F(P13)|<0.125*max(F(P12),F(P13)) and
|F(P22)−F(P23)|<0.125*max(F(P22),F(P23)), the area image is determined as pure color entity area; otherwise it is determined as non-pure color entity area.

8. The super-resolution reconstructing method as claimed in claim 7, wherein (F(P)) is the sum of RGB values of original image pixel point (P), that is, F(P)=P(R)+P(G)+P(B); when the area image is determined as pure color entity area, corresponding interpolated points (A), (B) and (C) satisfy that A=P11+P21, B=P11, and C=P11+P21.

9. The super-resolution reconstructing method as claimed in claim 1, wherein when traverses the original image pixel point (P11), the original image pixel points (P10), (P11), (P12) and (P13) are edges and the other 12 original image pixel points (P00), (P01), (P02), (P03), (P20), (P21), (P22), (P23), (P30), (P31), (P32), (P33) are not edge, then if:
|F(P01)−F(P11)|<0.125*max(F(P01),F(P11)),
|F(P02)−F(P12)|<0.125*max(F(P02),F(P12)),
|F(P21)−F(P31)|<0.125*max(F(P21),F(P31)), and
|F(P22)−F(P32)|<0.125*max(F(P22),F(P32)), the area image is determined as pure color entity area; otherwise it is determined as non-pure color entity area.

10. The super-resolution reconstructing method as claimed in claim 9, wherein the (F(P)) is the sum of RGB values of original image pixel point (P), that is, F(P)=P(R)+P(G)+P(B); when the area image is determined as pure color entity area, corresponding interpolated points (A), (B) and (C) satisfy that A=P21+P22, B=P11+P12, and C=P21.

11. The super-resolution reconstructing method as claimed in claim 1, wherein when traverse the original image pixel point (P11), the original image pixel points (P22), (P23), (P30) and (P31) are edges and the other 12 original image pixel points (P00), (P01), (P02), (P03), (P10), (P11), (P12), (P13), (P20), (P21), (P32), (P33) are not edge, then if:
|F(P02)−F(P12)|<0.125*max(F(P02),F(P12)),
|F(P03)−F(P13)|<0.125*max(F(P03),F(P13)),
|F(P22)−F(P32)|<0.125*max(F(P22),F(P32)), and
|F(P23)−F(P33)|<0.125*max(F(P23),F(P33)), the area image is determined as pure color entity area; otherwise it is determined as non-pure color entity area.

12. The super-resolution reconstructing method as claimed in claim 11, wherein the (F(P)) is the sum of RGB values of original image pixel point (P), that is, F(P)=P(R)+P(G)+P(B); when the area image is determined as pure color entity area, corresponding interpolated points (A), (B) and (C) satisfy that A=P21+P22, B=P11+P12, and C=P11+P21.

13. The super-resolution reconstructing method as claimed in claim 1, wherein when traverse the original image pixel point (P11), the original image pixel points (P02), (P12), (P20) and (P21) are edges and the other 12 original image pixel points (P00), (P01), (P03), (P10), (P11), (P13), (P22), (P23), (P30), (P31), (P32), (P33) are not edge, then if:
|F(P01)−F(P11)|<0.125*max(F(P01),F(P11)),
|F(P02)−F(P12)|<0.125*max(F(P02),F(P12)),
|F(P21)−F(P31)|<0.125*max(F(P21),F(P31)), and
|F(P22)−F(P23)|<0.125*max(F(P22),F(P23)), the area image is determined as pure color entity area; otherwise it is determined as non-pure color entity area.

14. The super-resolution reconstructing method as claimed in claim 13, wherein the (F(P)) is the sum of RGB values of original image pixel point (P), that is, F(P)=P(R)+P(G)+P(B); when the area image is determined as pure color entity area, corresponding interpolated points (A), (B) and (C) satisfy that A=P21+P22, B=P11, and C=P21.

15. The super-resolution reconstructing method as claimed in claim 1, wherein when traverse the original image pixel point (P11), the original image pixel points (P10), (P11), (P22) and (P32) are edges and the other 12 original image pixel points (P00), (P01), (P02), (P03), (P12), (P13), (P20), (P21), (P23), (P30), (P31), (P33) are not edge, then if:
|F(P10)−F(P11)|<0.125*max(F(P10),F(P11)),
|F(P20)−F(P21)|<0.125*max(F(P20),F(P21)),
|F(P12)−F(P13)|<0.125*max(F(P12),F(P13)), and
|F(P22)−F(P23)|<0.125*max(F(P22),F(P23)), the area image is determined as pure color entity area; otherwise it is determined as non-pure color entity area.

16. The super-resolution reconstructing method as claimed in claim 15, wherein the (F(P)) is the sum of RGB values of original image pixel point (P), that is, F(P)=P(R)+P(G)+P(B); when the area image is determined as pure color entity area, corresponding interpolated points (A), (B) and (C) satisfy that A=P11+P21, B=P11, and C=P11+P21.

* * * * *